United States Patent [19]

Tsutsumi et al.

[11] Patent Number: 5,625,018
[45] Date of Patent: Apr. 29, 1997

[54] PROCESS FOR PRODUCING CHLOROPRENE RUBBER

[75] Inventors: Yoshitaka Tsutsumi, Kudamatsu; Takashi Yamamoto; Takeshi Hironaka, both of Shinnanyo; Tadashi Hayashi, Tokuyama, all of Japan

[73] Assignee: Tosoh Corporation, Yamaguchi, Japan

[21] Appl. No.: 594,167

[22] Filed: Jan. 31, 1996

[30] Foreign Application Priority Data

Feb. 1, 1995 [JP] Japan .................................. 7-015111

[51] Int. Cl.$^6$ ...................................................... C08F 2/24
[52] U.S. Cl. ...................... 526/201; 526/225; 526/295; 528/487
[58] Field of Search ................................. 526/201, 203, 526/295, 225; 528/487

[56] References Cited

U.S. PATENT DOCUMENTS

| | | | |
|---|---|---|---|
| 2,914,497 | 11/1959 | Keller | 526/295 X |
| 4,704,441 | 11/1987 | Musch | 526/295 X |
| 4,975,501 | 12/1990 | Musch et al. | 526/295 X |
| 5,258,466 | 11/1993 | Sackmann et al. | 526/201 X |

FOREIGN PATENT DOCUMENTS 1537590 1/1979 United Kingdom.

*Primary Examiner*—Fred Teskin
*Attorney, Agent, or Firm*—Sughrue, Mion, Zinn, Macpeak & Seas

[57] ABSTRACT

A chloroprene rubber having a shade of white only slightly tinged with pale yellow and exhibiting good tackiness is prepared by an aqueous radical emulsion polymerization of chloroprene or a mixture comprised of chloroprene and a copolymerizable monomer, wherein the polymerization is effected by using an alkali metal salt of a disproportioned rosin acid as an emulsifier, and a water-soluble polymeric substance as a dispersion stabilizer which has a sulfonic acid group and/or sulfate ester groups, which group has been introduced by an addition polymerization procedure or by a procedure of a polymeric reaction following an addition polymerization.

10 Claims, No Drawings

1

PROCESS FOR PRODUCING CHLOROPRENE RUBBER

BACKGROUND OF THE INVENTION (1) Field of the Invention

This invention relates to a process for producing chloroprene rubber. More particularly, it relates to a process for producing chloroprene rubber characterized in that it exhibits an enhanced whiteness, i.e., a reduced yellowness and, when it is used as an adhesive, an appropriate tackiness of the adhesive applied on an adherend can be kept over a long period.

(2) Description of the Related Art

Chloroprene rubber is highly crystalline and exhibits a large cohesive force, and therefore, it is widely used as adhesives. Among the chloroprene rubber adhesives, a solution-grafted chloroprene rubber adhesive is known as useful for adhering plasticized vinyl chloride resin adherends, which adhesive is prepared by incorporating a monomer such as, for example, methyl methacrylate and a radical polymerization initiator such as benzoyl peroxide in a solution of chloroprene rubber in an organic solvent such as toluene or methyl ethyl ketone, whereby a graft polymerization is caused. The solution-grafted chloroprene rubber exhibits an enhanced adhesion and therfore has heretofore been used popularly for adhering synthetic leather substitutes such as in synthetic leather shoes.

Processes for producing chloroprene rubber are known from of old. One typical example of the production processes is described in Encyclopedia of Polymer Science and Engineering, 2nd ed., vol. 3, Wiley-Interscience, New York, 1985, p447–449. In this production process, first, an emulsion polymerization is conducted by using a soap such as an alkali metal salt of a disproportioned rosin acid as an emulsifier, and an emulsion stabilizer such as, for example, an alkali metal salt of a condensate of naphthalenesulfonic acid with formaldehyde; then unreacted monomer is removed by steam flashing, i.e., steam distillation under conditions such as, for example, a temperature of 50° C. and an absolute pressure of 100 Torr; and finally the polymer latex is subjected to freeze-coagulation or salting-out to give chloroprene rubber.

In the final step, the polymer latex as obtained by the emulsion polymerization and having a pH value of 12 to 13 is acidified to a pH value of 5 to 7 by adding dilute acetic acid. By the acidification, the alkali metal salt of the disproportioned rosin acid used as the emulsifier changes to an acid form, and thus, loses an emulsifying function. Therefore, unless an emulsion stabilizer, i.e., a surface active agent capable of imparting a stability to the polymer emulsion latex, is made present therein, the latex is undesirably coagulated and thus it becomes impossible that the latex is subjected to freeze-coagulation or salting-out. As an example of the emulsion stabilizer, there can be mentioned an alkali metal salt of a condensate of naphthalenesulfonic acid with formaldehyde. By the incorporation of the emulsion stabilizer, the polymer latex is stabilized and can be subjected to freeze-coagulation or salting-out on a rotating cooling drum. The freeze-coagulated polymer latex is then melted, washed and mechanically compressed into a film form, which is then dried on a belt by hot air in a dryer.

Chloroprene rubber produced by the above-mentioned process has a shade of white tinged with yellowish brown. The L value, a value and b value of the chloroprene rubber as measured by Lab reflection are in the ranges of 65 to 75, −2.0 to −3.0 and 10.0 to 16.0, respectively. An adhesive made from the chloroprene rubber is characterized in that the yellowness index as determined according to the light absorption is in the range of 0.4 to 0.6 and thus the adhesive does not satisfactorily meet the requirements for synthetic shoes that the adhesive must be transparent and colorless.

To improve the conventional chloroprene rubber, a proposal has been made in Japanese Unexamined Patent Publication No. 57-34844 wherein a combination of an alkali metal salt of a disproportioned rosin acid with a specific additional surface active agent is used as an emulsifier. As specific examples of the additional surface active agent, there can be mentioned alkali matal salts of a $C_{12-15}$ alkylsulfonic acid, alkali metal salts of a 1,3-bis-(2-ethyl-hexyl) glycerol-ether sulfuric acid ester, alkali metal salts of α-hydroxy-octadecanesulfonic acid, alkali metal esters of a ferric $C_{12-14}$-alkylsulfuric acid ester, alkali metal salts of monolauric acid glyceride sulfuric acid ester, and alkali salts of N-octadecylsulfosuccinic acid. By this proposed method, chloroprene rubber having a very light color can be obtained, but the tackiness attributed to an alkali metal salt of a condensate of naphthalenesulfonic acid with formaldehyde is deteriorated to some extent and thus the resulting chloroprene rubber adhesive still has a problem.

In view of the foregoing, there is an increasing demand for developing a chloroprene rubber adhesive having a shade of white only slightly tinged with pale yellow, and good tackiness.

SUMMARY OF THE INVENTION

A primary object of the present invention is to provide a process for producing a chloroprene rubber characterized in that it exhibits an enhanced whiteness, i.e., a reduced yellowness and, when it is used as an adhesive, an appropriate tackiness of the adhesive applied on an adherend can be kept over a long period.

In accordance with the present invention, there is provided a process for producing a chloroprene rubber wherein chloroprene or a mixture comprised of chloroprene and a monomer copolymerizable therewith is subjected to an aqueous radical emulsion polymerization, characterized in that the polymerization is effected by using an alkali metal salt of a disproportioned rosin acid as an emulsifier, and a water-soluble polymeric substance as a dispersion stabilizer, said polymeric substance having at least one kind of group selected from a sulfonic acid group and sulfate ester groups, which group has been introduced by at least one procedure selected from an addition polymerization procedure and a procedure of a polymeric reaction following an addition polymerization.

Preferably, the water-soluble polymeric substance used as a dispersion stabilizer has a styrenesulfonic acid structure, and is especially a water-soluble salt of a copolymer of styrenesulfonic acid with at least one kind of a copolymerizable monomer selected from unsaturated carboxylic acids and unsaturated carboxylic acid amides.

DESCRIPTION OF THE PREFERRED EMBODIMENTS

The chloroprene rubbers produced by the process of the present invention may be either a homopolymer of chloroprene, or a copolymer made from chloroprene and not more than 50% by weight of at least one copolymerizable monomer, based on the total of chloroprene and the copolymerizable monomer. As examples of the copolymerizable monomer, there can be mentioned unsaturated carboxylic acid esters such as acrylic acid esters and methacrylic acid esters, unsaturated carboxylic acids such as acrylic acid, methacrylic acid, itaconic acid and maleic acid, vinyl-substituted aromatic compounds such as styrene and vinyltoluene, conjugated dienes such as butadiene, 1-chlorobutadiene and 2,3-dichlorobutadiene, and polar group containing compounds such as acrylonitrile, methacrylonitrile, vinyl chloride and vinylidene chloride.

The alkali metal salt of a disproportioned rosin acid used in the present invention is not particularly limited provided that it is capable of exhibiting a function as an emulsifier when chloroprene is subjected to an emulsion polymerization. As examples of the alkali metal salt of a disproportioned rosin acid, there can be mentioned a sodium salt of a disproportioned rosin acid and a potassium salt of a disproportioned rosin acid. These disproportioned rosin acid salts can be prepared by disproportionation of wood rosin and wood resins. The disproportioned rosin acid used is preferably composed of disproportioned rosin acid having a molecular weight of not larger than about 500 because such a low-molecular-weight rosin acid has a very light color. Especially preferably the disproportioned rosin acid is prepared by vacuum distillation under nitrogen-sealed conditions.

The amount of the alkali metal salt of a disproportioned rosin acid used in the present invention is not particularly limited, but is preferably in the range of 2 to 6 parts by weight, more preferably 3 to 5.5 parts by weight, based on 100 parts by weight of the monomer or monomers for chloroprene rubber. When the amount of the alkali metal salt of a disproportioned rosin acid is within this preferred range, the latex particles exhibit a high stability upon emulsion polymerization, undesirable precipitation of solid rubber caused by a physical external pressure in the final finishing step can be avoided, and the resulting chloroprene exhibits an enhanced whiteness.

In the process of the present invention, a water-soluble polymeric substance having at least one kind of group selected from a sulfonic acid group and sulfate ester groups, which groups have been introduced by at least one procedure selected from (i) an addition polymerization procedure and (ii) a procedure of polymeric reaction following an addition polymerization, is used as a dispersion stabilizer, in combination with the alkali metal salt of a disproportioned rosin acid as an emulsifier.

Where the water-soluble polymeric substance used as a dispersion stabilizer has a styrenesulfonic acid structure, and especially where it is a water-soluble salt of a copolymer of styrenesulfonic acid with at least one kind of a copolymerizable monomer selected from unsaturated carboxylic acids and unsaturated carboxylic acid amides, the benefits of the water-soluble polymeric substance are most prominently manifested. Namely, the sulfonic acid groups and/or sulfate ester groups, which have been introduced by an addition polymerization procedure and/or a procedure of a polymeric reaction following an addition polymerization, afford a strongly anionic water-soluble polymeric substance having an enhanced whiteness and a good tackiness.

The water-soluble polymeric substance having the sulfonic acid groups and/or sulfate ester groups is prepared typically by (i) a first process wherein at least one monomer having a radically polymerizable or ionically polymerizable unsaturated double bond, and further having a sulfonic acid group and/or a sulfate ester group is subjected to addition polymerization by an ion polymerization or radical polymerization procedure, or (ii) a second process wherein at least one monomer having a radically polymerizable or ionically polymerizable unsaturated double bond is subjected to addition polymerization by an ion polymerization or radical polymerization procedure, and the resulting polymer is subjected to a polymeric reaction, whereby the polymer is treated with a compound having a sulfonic acid group and/or a sulfate ester group, or a compound capable of forming a sulfonic acid group and/or a sulfate ester group.

As examples of the monomer having a sulfonic acid group and/or sulfate ester group used in the first process for the preparation of the water-soluble polymeric substance having the sulfonic acid groups and/or sulfate ester groups, there can be mentioned allylsulfonic acid and water-soluble salts thereof, methallylsulfonic acid and water-soluble salts thereof, vinylsulfonic acid and water-soluble salts thereof, 2-acrylamide-2-methylpropanesulfonic acid and water-soluble salts thereof, p-vinylbenzylsulfonic acid and water-soluble salts thereof, sulfoethyl methacrylate and water-soluble salts thereof, sulfopropyl methacrylate and water-soluble salts thereof, styrenesulfonic acid and water-soluble salts thereof, alkyl aryl sulfate salts, and water-soluble salts of o-propenyl-p-alkyl-polyoxyethylene phenyl ether sulfate esters. As examples of the water-soluble salts, there can be mentioned alkali metal salts, an ammonium salt and organic amine salts. These monomers may be used either alone or in combination.

The above-listed monomers may be copolymerized with other monomers which include, for example, unsaturated carboxylic acid esters such as acrylic acid esters and methacrylic acid esters, unsaturated carboxylic acids such as acrylic acid, methacrylic acid and maleic anhydride, unsaturated carboxylic acid amides such as acrylamide, methacrylamide and propylacrylamide, vinyl-substituted aromatic compounds such as styrene and vinyltoluene, and polar group-having vinyl compounds such as acrylonitrile, methacrylonitrile, vinyl acetate, vinyl propionate, vinyl chloride and vinylidene chloride.

Where the water-soluble polymeric substance having sulfonic acid groups and/or sulfate ester groups is a water-soluble polymeric substance having a styrenesulfonic acid structure, especially where the water-soluble polymeric substance is a water-soluble salt of a copolymer comprised of styrenesulfonic acid with an unsaturated carboxylic acid or an unsaturated carboxylic acid amide, it exhibits good and balanced hydrophobic and hydrophilic characteristics, a good dispersion stability is obtained with a small quantity of the polymeric substance, and the chloroprene rubber exhibits a reduced yellowness and a good tackiness.

The addition polymerization of the above-listed monomers for the preparation of the water-soluble polymeric substance having the sulfonic acid groups and/or sulfate ester groups can be carried out by the conventional radical or ion polymerization procedure. For example, in the case of a monomer having a sulfonic acid group and/or a sulfate ester group, it is subjected to radical polymerization by a solution polymerization procedure using a polar solvent such as dimethylformamide or dimethyl sulfoxide, or water or a water/alcohol mixed solvent, a free-radical initiator such as an azo compound or a persulfate, and a molecular weight modifier such as a mercaptan.

In the second process for the preparation of the water-soluble polymeric substance having sulfonic acid groups and/or sulfate ester groups, the polymeric reaction for introducing a sulfonic acid group and/or a sulfate ester group in the polymer prepared by addition polymerization is effected, for example, by feeding liquid sulfur trioxide into a solution of a polymer such as polystyrene in a solvent such as ethylene dichloride whereby a sulfonic acid group is introduced in the polymer.

The amount of the sulfonic acid group and/or sulfate ester groups introduced in the water-soluble polymeric substance is not particularly limited provided that the polymeric substance is soluble in water and the intended reduced yellowness and good tackiness are obtained. Usually the amount of the sulfonic acid group and/or sulfate ester groups is at least 10% by mole, preferably at least 30% by mole and more preferably at least 50% by mole. In the case where the water-soluble polymeric substance is a copolymer comprised of styrenesulfonic acid with an unsaturated carboxylic acid and/or an unsaturated carboxylic acid amide, the amount of the styrenesulfonic acid is usually 10 to 90% by mole, preferably 50 to 90% by mole, based on the sum of the styrenesulfonic acid and the unsaturated carboxylic acid and/or unsaturated carboxylic acid amide.

The molecular weight of the water-soluble polymeric substance is also not particularly limited, but the weight average molecular weight is preferably in the range of $\times 10^3$ to $1 \times 10^5$, more preferably $1 \times 10^3$ to $1 \times 10^4$. Where the molecular weight is within this range, the dispersion stability is prominently manifested and undesirable cohesion can be avoided.

The optimum amount of the water-soluble polymeric substance used as a dispersion stabilizer varies depending upon the particular content of a sulfonic acid group and/or a sulfate ester group, molecular weight, and type of molecular structure, and thus the amount thereof used is not particularly limited. However, the amount of the water-soluble polymeric substance is preferably in the range of 0.1 to 2 parts by weight, more preferably of 0.2 to 1 part by weight, based on 100 parts by weight of the monomer or monomers. With this amount, the latex stability upon adjustment of pH in the final finishing step is enhanced and the chloroprene rubber has a reduced yellowness and a good tackiness.

Where chloroprene or a chloroprene mixture is subjected to an aqueous radical emulsion polymerization, the water-soluble polymeric substance having sulfonic acid groups and/or sulfate ester groups can be incorporated together with the alkali metal salt of a disproportioned rosin acid into the monomer charge, or can be incorporated in a chloroprene polymer latex after completion of polymerization. Preferably the water-soluble polymeric substance having sulfonic acid groups and/or sulfate ester groups is incorporated together with the alkali metal salt of a disproportioned rosin acid into the monomer charge, because undesirable precipitation during the emulsion polymerization can be minimized.

If desired, other emulsifiers and dispersion stabilizers can be used in combination with the alkali metal salt of a disproportioned rosin acid and the water-soluble polymeric substance having sulfonic acid groups and/or sulfate ester groups. The emulsifiers and dispersion stabilizers include those of an anionic type and those of a nonionic type. As specific examples of the other emulsifiers and dispersion stabilizers, there can be mentioned sulfonic acid-type surfactants such as alkali metal alkylsulfonates and alkali metal alkylarylsulfonates, sulfate ester-type surfactants such as alkali metal alkylsulfate esters and alkali metal polyethylene glycol ether sulfate esters, sulfonic acid-containing polycondensates such as a condensate of sodium naphthalenesulfonate with formaldehyde, a condensate of bisphenolsulfonic acid and a condensate of melaminesulfonic acid with formaldehyde, and nonionic surfactants such as a polyoxyethylene alkyl ether, a polyoxyethylene alkyl phenol, a sorbitan fatty acid ester and a polyoxyethylene acyl ester.

The aqueous emulsion polymerization can be conducted by the conventional procedure wherein an aqueous emulsion is prepared from water, the monomer or monomers, the emulsifier, the dispersion stabilizer, a free-radical initiator and a molecular weight modifier, and the aqueous emulsion is maintained at a predetermined polymerization temperature. The monomer and the other ingredients can be incorporated either at one time, or dividedly or sequentially in small portions. A short-stopper can be added when a desired conversion is reached. The conversion is preferably in the range of 50 to 80% in view of ease in recovery of polymer and the viscosity of polymer latex.

The free-radical initiator used for polymerization includes conventional free radical-producing substanses. As examples of the free-radical initiator, there can be mentioned persulfates such as potassium persulfate and ammonium persulfate, inorganic and organic peroxides such as hydrogen peroxide and tert.-butyl hydroperoxide, and azo compounds such as 2,2'-azobis-(2-amidinopropane) hydrochloride and 2,2'-azobis-(N,N'-dimethyleneisobutylamidine) hydrochloride. These free-radical initiators may be used alone, or as a redox initiator, i.e., in combination with a reducing substance such as a thiosulfate, a thiosulfite or an organic amine. The polymerization temperature is usually in the range of 0° to 80° C. The short-stopper includes conventional short-stoppers used in radical polymerization, such as, for example, phenothiazine, 2,6-di-tert.-butyl-4-methylphenol, hydroxylamine and 2,2'-methylene-bis-(4-ethyl-6-tert.-butylphenol). As the molecular weight modifier, a chain transfer agent is usually used such as, for example, an alkylmercaptan, a halogenated hydrocarbon, an alkylxanthogen-disulfide or sulfur.

Unreacted monomer and other organic ingredients are removed by steam flashing, i.e., by steam distillation at a temperature of 50° C. and an absolute pressure of 100 Torr. Then pH of the latex is adjusted, and the latex is freeze-coagulated, for example, on a rotating cooling drum, washed and then mechanically pressed into a sheet form. The film is then hot air-dried by, for example, a belt drier to afford chloroprene rubber.

The chloroprene rubber obtained by the process of the present invention can be used as a base material for a solution-grafted chloroprene rubber adhesive, one-pack type adhesive and two-pack type adhesive.

The solution-grafted chloroprene rubber adhesive exhibits a an enhanced whiteness and a good tackiness. The absorbance at 440 nm of the solution-grafted chloroprene rubber adhesive is usually in the range of 0.2 to 0.4. The solution-grafted chloroprene rubber adhesive can be prepared by the conventional procedure wherein methyl methacrylate or another methacrylate or acrylate monomer is grafted onto chloroprene polymer in a solution in an organic solvent. The organic solvent includes, for example, aromatic hydrocarbons such as benzene, toluene and xylene, and ketones such as methyl ethyl ketone, methyl propyl ketone and methyl butyl ketone. These solvents may be used alone or in combination. As a free-radical initiator for the solution-grafting reaction, various free-radical initiators can be used, which include, for example, azobisisobutyronitrile, lauroyl peroxide and benzoyl peroxide. The graft-reaction temperature is not particularly limited, and is for example in the range of 60° to 120° C. The graft-reaction is completed by the addition of a short-stopper. As examples of the short-stopper, there can be mentioned 2,6-di-tert.-butyl-4- methylphenol, 2,6-di-tert.-butyl-4-phenylphenol, 2,2'-methylenebis(4-ethyl-6-tert.-butylphenol) and 2,2'-methylenebis(4-methyl-6-tert.-butylphenol).

A one-pack type adhesive having excellent shade, tackiness, stickiness and adhesion is prepared by incorporating as the base material the chloroprene rubber obtained by the process of the present invention, with a metal oxide such as zinc oxide or magnesium oxide, a modified phenol resin, an organic solvent and various additives in a conventional manner. The shade of the chloroprene rubber adhesive is such that the absorbance at 440 nm of a solution containing 5 weight % of the chloroprene rubber in toluene is in the range of 0.03 to 0.2.

A two-pack type adhesive composed of a rubber solution based on the chloroprene rubber obtained by the process of the present invention, and a polyisocyanate, also has excellent shade, tackiness, stickiness and adhesion. As the polyisocyanate used in combination with the chloroprene rubber solution, polyisocyanates having an average functional number of at least two can be used. As specific examples of the polyisocyanate, there can be mentioned tolylene diisocyanate (hereinafter abbreviated to "TDI"), 4,4'-diphenylmethane diisocyanate, hexamethylene diisocyanate, 1,5-naphthylene diisocyanate, polymethylene polyphenylisocyanate, triphenylmethane triisocyanate, tris-(4-phenylisocyanate) thiphosphate, TDI dimer and TDI trimer. The amount of the polyisocyanate is 0.1 to 5 parts by weight as the amount of the effective polyisocyanate ingredient per 100 parts by weight of the chloroprene rubber adhesive solution.

The adhesive comprising as the basic material the chloroprene rubber obtained by the process of the present invention may have incorporated therein various additives such as, for example, phenol resins, rosins, coumarone resins, metal oxides, antioxidants and fillers.

The invention will now be specifically described by the following examples that illustrate embodiments of the invention and by no means limit the scope of the invention. In the examples, parts and % are by weight unless otherwise specified.

Shades of chloroprene rubber, a chloroprene rubber solution and a chloroprene rubber adhesive, a resistance to shade change by heat-aging, resistance to shade change by ultraviolet rays, and tackiness of chloroprene rubber were evaluated by the following methods.

(i) Shade of chloroprene rubber

Chloreprene rubber is heat-pressed by using a hydraulic press ("Shindo SF type" made by Shindo Metal Ind. Co.) at a temperature of 100° C. and a pressure of 120 kg/cm² for 5 minutes to form a sheet, and then cooled to 20° C. and maintained at that temperature for 5 minutes to prepare a testing specimen. Using a color analyzer (model 607 made by Hitachi Ltd.), color measurement is conducted according to a Lab method (reflection method) and hue is evaluated by the index b. The index b signifies the degree of yellow color on the (+) side, and the degree of blue color on the (−) side.

The closer to zero on the (+) side the index b is, the closer to whiteness the color of the chloroprene rubber becomes.

(ii) Shade of chloroprene rubber solution

Chloroprene rubber is dissolved in toluene to prepare a solution of 5% concentration. The shade (yellowness) is evaluated by measuring the light absorbance at a wavelength of 440 nm by using a spectrophotometer (model U-1000 made by Hitachi Ltd.). The smaller the absorbance value, the closer to whiteness the shade of the rubber solution.

(iii) Resistance to shade change by heat aging

Chloroprene rubber is heated at a temperature of 70° C. for 3 days in a Geer oven, and the index b and the light absorbance are measured by the above-mentioned methods (i) and (ii), respectively.

(iv) Resistance to shade change by ultraviolet rays

Chloroprene rubber is irradiated with ultraviolet rays at a wavelength of 254 nm at a temperature of 20° C. for 4 or 10 hours, and the shade of the surface of chloroprene rubber is observed by the naked eye. The evaluation results are expressed by the following three ratings.

A: Pale yellow
B: Yellowish brown
C: Dark yellowish brown (v) Shade of chloroprene rubber adhesive Shade of an adhesive of a solution-grafted chloroprene rubber is evaluated on a solution thereof by the above-mentioned method (ii).

(vi) Tackiness of chloroprene rubber

Chloroprene rubber is dissolved in toluene to prepare a solution of 15% concentration. Ethylene-vinyl acetate copolymer (EVA) foams are coated with the chloreprene rubber solution, and the coatings are allowed to stand at room temperature. The tackiness of the chloroprene rubber is evaluated by the length of time for which the rubber-coated EVA foams can be adhered to each other. The results are expressed by the following three ratings.

A: Very good (adhesion is possible after standing for 60 minutes or more)
B: Moderate
C: Poor (adhesion is impossible after standing for 10 minutes).

EXAMPLE 1

An autoclave having a volume of 10 liters was charged with chloroprence, n-dodecyl mercaptan, disproportioned potassium rosinate, poly(sodium styrenesulfonate) (weight average molecular weight: 7,000), sodium hydrosulfite, sodium hydroxide and water in amounts shown in Table 1. The content was stirred in a nitrogen atmosphere, and an aqueous 0.35% potassium persulfate solution was continuously dropwise added at 12° C. to initiate polymerization. When the conversion reached 70%, 0.05% of 2,2'-methylenebis-(4-ethyl-6-t-butylphenol) was added as a short-stopper to terminate polymerization. No precipitate was found in the thus-obtained polymer latex.

TABLE 1

| Run No. | 1 | 2 | 3 | 4 | 5 | 6 | 7 | 8 | 9 |
| --- | --- | --- | --- | --- | --- | --- | --- | --- | --- |
| Chloroprene | 100 | 100 | 100 | 100 | 100 | 100 | 100 | 100 | 100 |
| n-Dodecyl mercaptan | 0.12 | 0.12 | 0.12 | 0.12 | 0.12 | 0.12 | 0.12 | 0.12 | 0.12 |
| Disproportioned | 4.0 | 4.0 | 4.0 | 4.0 | 4.0 | 2.0 | 4.0 | 4.0 | 1.0 |

TABLE 1-continued

| Run No. | 1 | 2 | 3 | 4 | 5 | 6 | 7 | 8 | 9 |
|---|---|---|---|---|---|---|---|---|---|
| K rosinate *1 | | | | | | | | | |
| PNass-07 *2 | 0.2 | 0.7 | 0.7*a | 0.1 | 1.5 | 0.7 | 0.05 | 3.0 | 0.7 |
| FNS *3 | — | — | — | 0.1 | — | — | — | — | — |
| Reducing agent *4 | 0.005 | 0.005 | 0.005 | 0.005 | 0.005 | 0.005 | 0.005 | 0.005 | 0.005 |
| Sodium hydroxide | 0.2 | 0.2 | 0.2 | 0.2 | 0.2 | 0.2 | 0.2 | 0.2 | 0.2 |
| Pure water | 100 | 100 | 100 | 100 | 100 | 100 | 100 | 100 | 100 |
| Short-stopper *5 | 0.05 | 0.05 | 0.05 | 0.05 | 0.05 | 0.05 | 0.05 | 0.05 | 0.05 |

Note: *1 Disproportioned potassium rosinate (tradename "Rondis R" supplied by Arakawa Chem. Co.)
*2 Poly(sodium styrenesulfonate) (weight average molecular weight = 7,000)
*3 Condensation product of naphthalenesulfonic acid with formaldehyde (tradename "Demol" supplied by Kao Corp.)
*4 Sodium hydrosulfite
*5 2,2'-methylenebis-(4-ethyl-6-t-butylphenol)
*a Added after polymerization is completed Unreacted monomer remaining in the polymer latex was removed by a steam flashing method. Diluted acetic acid was added to the polymer latex to adjust the pH value to 6, and the polymer latex was freeze-coagulated, washed with water and hot-air dried to give a chloroprene rubber. No abnormal behavior was observed in the final step of the chloroprene rubber production.

A composition comprising 100 parts of the chloroprene rubber, 460 parts of toluene, 115 parts of methyl ethyl ketone, and 90 parts of methyl methacrylate was heated to 90° C. and 0.5 part of benzoyl peroxide was added to initiate a reaction of grafting methyl methacrylate onto the chloroprene rubber. After the reaction was conducted for about 6 hours, 2 parts of 2,6-di-tert.-butyl-4-methylphenol was added to stop the reaction, whereby a solution-grafted chloroprene rubber adhesive was obtained. The conversion of methyl methacrylate was about 35%.

Shades of the chloroprene rubber, the chloroprene rubber solution and the chloroprene rubber adhesive, resistance to shade change by heat-aging, resistance to shade change by ultraviolet rays, and tackiness of chloroprene rubber were evaluated and the results are shown in Table 2.

As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 2

A chloroprene rubber adhesive was prepared by the same procedures as those described in Example 1 except that the amount of poly(sodium styrenesulfonate) (weight average moleculat weight: 7,000) was changed to 0.7 part as shown in Table 1 with all other conditions remaining the same. No precipitate was found in the polymer latex. No abnormal behavior was observed in the final step of the chloroprene rubber production.

Characteristics of the chloroprene rubber, its solution and adhesive were evaluated. The results are shown in Table 2. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

TABLE 2

| Run No. | 1 | 2 | 3 | 4 | 5 | 6 | 7 | 8 | 9 |
|---|---|---|---|---|---|---|---|---|---|
| Presence of deposit *1 upon polymerization | Not | Not | Sli. | Not | Not | Sli. | Sli. | Not | Large |
| Presence of deposit upon neutralization | Not | Not | Not | Not | Not | Not | Large | Not | Not |
| upon water-washing | Not | Not | Not | Not | Sli. | Not | Not | Large | Not |
| Shade of rubber (b value) | 7.0 | 7.8 | 7.7 | 7.5 | 8.7 | 7.5 | 7.0 | 9.5 | 7.5 |
| Shade of rubber solution (light absorbance) | 0.05 | 0.10 | 0.08 | 0.05 | 0.14 | 0.05 | 0.05 | 0.20 | 0.10 |
| Shade change by heat-aging (b value) | 10.7 | 11.2 | 11.0 | 11.0 | 11.7 | 10.8 | 10.0 | 12.2 | 11.0 |
| (light absorbance) | 0.08 | 0.11 | 0.11 | 0.10 | 0.20 | 0.08 | 0.12 | 0.30 | 0.15 |
| Shade change by ultraviolet rays | | | | | | | | | |
| (4 hours) | A | A | A | A | A | A | A | A | A |
| (10 hours) | B | B | B | B | B | B | B | B | B |
| Shade of adhesive (light absorbance) | 0.28 | 0.32 | 0.30 | 0.30 | 0.35 | 0.32 | 0.30 | 0.35 | 0.30 |
| Tackiness | A | A | A | A | A | A | A | A | A |

Note: Not = not present, Sli. = slightly present, Large: large amount of deposit was present

EXAMPLE 3

A chloroprene rubber adhesive was prepared by the same procedures as those described in Example 2 and according to the starting material recipe shown in Table 1, except that the poly(sodium styrenesulfonate) (weight average molecular weight: 7,000) was added after the addition of the short-stopper with all other conditions remaining the same. Only a slight amount of precipitate was found on the stirrer. No abnormal behavior was observed in the final step of the chloroprene rubber production.

Characteristics of the chloroprene rubber, its solution and adhesive were evaluated. The results are shown in Table 2. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 4

A chloroprene rubber adhesive was prepared by the same procedures as those described in Example 1 except that 0.1 part of poly(sodium styrenesulfonate) (weight average molecular weight: 7,000) and 0.1 part of a condensate of naphthalenesulfonic acid with formaldehyde ("Demol" supplied by Kao Corp.) were used instead of 0.2 part of poly(sodium styrenesulfonate) (weight average molecular weight: 7,000) as shown in Table 1 with all other conditions remaining the same. No precipitate was found in the polymer latex. No abnormal behavior was observed in the final step of the chloroprene rubber production.

Characteristics of the chloroprene rubber, its solution and adhesive were evaluated. The results are shown in Table 2. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 5

A chloroprene rubber adhesive was prepared by the same procedures as those described in Example 1 except that the amount of poly(sodium styrenesulfonate) (weight average molecular weight: 7,000) was changed to 1.5 parts as shown in Table 1 with all other conditions remaining the same. No precipitate was found in the polymer latex. A slight amount of rubber was flowed out upon water-washing, but there was no appreciable obstacle to the production of the chloroprene rubber.

Characteristics of the chloroprene rubber, its solution and adhesive were evaluated. The results are shown in Table 2. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 6

A chloroprene rubber adhesive was prepared by the same procedures as those described in Example 2 except that the amount of the disproportioned potassium rosinate was changed to 2 parts as shown in Table 1 with all other conditions remaining the same. Only a slight amount of precipitate was found on the stirrer. No abnormal behavior was observed in the final step of the chloroprene rubber production.

Characteristics of the chloroprene rubber, its solution and adhesive were evaluated. The results are shown in Table 2. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 7

A chloreprene rubber adhesive was prepared by the same procedures as those described in Example 1 except that the amount of poly(sodium styrenesulfonate) (weight average molecular weight: 7,000) was changed to 0.09 part as shown in Table 1 with all other conditions remaining the same. Only a slight amount of precipitate was found on the stirrer. A large amount of rubber was precipitated when the pH of the latex wa adjusted to 6 with diluted sulfuric acid in the final step of the chloreprene rubber production, but the intended chloroprene rubber could be obtained.

Characteristics of the chloroprene rubber, its solution and adhesive were evaluated. The results are shown in Table 2. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 8

A chloroprene rubber adhesive was prepared by the same procedures as those described in Example 1 except that the amount of poly(sodium styrenesulfonate) (weight average molecular weight: 7,000) was changed to 3.0 parts as shown in Table 1 with all other conditions remaining the same. No precipitate was found in the polymer latex. A large amount of rubber was flowed out upon water-washing in the final step of the chloroprene rubber production, but the intended chloroprene rubber could be obtained.

Characteristics of the chloroprene rubber, its solution and adhesive were evaluated. The results are shown in Table 2. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 9

A chloreprene rubber adhesive was prepared by the same procedures as those described in Example 2 except that the amount of the disproportioned potassium rosinate was changed to 1 part as shown in Table 1 with all other conditions remaining the same. A salient amount of precipitate was produced during polymerization. But, there was no appreciable in the final step of the chloroprene rubber production.

Characteristics of the chloroprene rubber, its solution and adhesive were evaluated. The results are shown in Table 2. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 10

A chloroprene rubber adhesive was prepared by the same procedures as those described in Example 2 except that the amount of the disproportioned potassium rosinate was changed to 7 parts as shown in Table 3 with all other conditions remaining the same. No precipitate was found in the polymer latex. No abnormal behavior was observed in the final step of the chloroprene rubber production.

Shades of the chloroprene rubber, the chloroprene rubber solution and the chloroprene rubber adhesive, resistance to shade change by heat-aging, resistance to shade change by ultraviolet rays, and tackiness of chloroprene rubber were evaluated. The results are shown in Table 4.

As seen from these results, the shades of the chloroprene rubber, the chloroprene rubber solution and the chloroprene rubber adhesive are slightly yellowish, and shade change by heat-aging and ultraviolet rays is relatively large, as compared with those obtained in Example 2 wherein 4 parts of disproportioned potassium rosinate was used. But these characteristics were acceptable.

EXAMPLE 11

A chloroprene rubber adhesive was prepared by the same procedures as those described in Example 1 except that 0.5

TABLE 3

| Run No. | 10 | 11 | 12 | 13 | 14 | 15 | 16 | 17 |
|---|---|---|---|---|---|---|---|---|
| Chloroprene | 100 | 100 | 100 | 100 | 100 | 100 | 100 | 100 |
| n-Dodecyl mercaptan | 0.12 | 0.12 | 0.12 | 0.12 | 0.12 | 0.12 | 0.12 | 0.12 |
| Disproportioned K rosinate *1 | 7.0 | 4.0 | 4.0 | 4.0 | 4.0 | 2.0 | 4.0 | 4.0 |
| PNass-07 *2 | 0.7 | 0.7 | — | — | — | — | — | — |
| PNass-1 *6 | — | 0.5 | — | — | — | — | — | — |
| PNass-5 *7 | — | — | 0.5 | — | — | — | — | — |
| PNass-50 *8 | — | — | — | 0.5 | — | — | — | — |
| PAMPS *8 | — | — | — | — | 0.5 | — | — | — |
| PS-1900 *9 | — | — | — | — | — | 0.5 | — | — |
| PKvs *10 | — | — | — | — | — | — | 0.1 | — |
| Nass/MMA *11 | — | — | — | — | — | — | — | 0.1 |
| FNS *3 | — | — | — | 0.1 | — | — | 0.1 | — |
| Reducing agent *4 | 0.005 | 0.005 | 0.005 | 0.005 | 0.005 | 0.005 | 0.005 | 0.005 |
| Sodium hydroxide | 0.2 | 0.2 | 0.2 | 0.2 | 0.2 | 0.2 | 0.2 | 0.2 |
| Pure water | 100 | 100 | 100 | 100 | 100 | 100 | 100 | 100 |
| Short-stopper *5 | 0.05 | 0.05 | 0.05 | 0.05 | 0.05 | 0.05 | 0.05 | 0.05 |

Note *1 through *5 are the same as those in Table 1
*6 Poly(sodium styrenesulfonate) (weight average molecular weight = 10,000)
*7 Poly(sodium styrenesulfonate) (weight average molecular weight = 50,000)
*8 Poly(sodium styrenesulfonate) (weight average molecular weight = 500,000)
*9 Poly(sodium 2-acrylamide-2-methylpropanesulfonate) (weight average molecular weight = 10,000)
*10 Polystyrenesulfonic acid type high-molecular-weight anionic surface active agent (trademark "Polity PS"-1900 supplied by Lion Corp.)
*11 Sodium styrenesulfonate-methyl methacrylate copolymer (NaSS/MMA = 70/30 by mole, weight average molecular weight = 6,000)

TABLE 4

| Run No. | 10 | 11 | 12 | 13 | 14 | 15 | 16 | 17 |
|---|---|---|---|---|---|---|---|---|
| Presence of deposit *1 upon polymerization | Not | Not | Not | Not | Not | Not | Not | Not |
| Presence of deposit upon neutralization | Not | Not | Sli. | Large | Sli. | Not | Sli. | Not |
| upon water-washing | Not | Not | Not | Not | Not | Not | Not | Not |
| Shade of rubber (b value) | 11.5 | 7.0 | 7.5 | 7.5 | 7.1 | 7.0 | 7.9 | 7.5 |
| Shade of rubber solution (light absorbance) | 0.30 | 0.07 | 0.08 | 0.12 | 0.05 | 0.05 | 0.10 | 0.05 |
| Shade change by heat-aging | | | | | | | | |
| (b value) | 13.5 | 11.0 | 11.5 | 11.0 | 10.0 | 10.5 | 11.2 | 10.5 |
| (light absorbance) | 0.45 | 0.10 | 0.14 | 0.10 | 0.13 | 0.10 | 0.15 | 0.10 |
| Shade change by ultraviolet rays | | | | | | | | |
| (4 hours) | A | A | A | A | A | A | A | A |
| (10 hours) | B | B | B | B | B | B | B | B |
| Shade of adhesive (light absorbance) | 0.43 | 0.30 | 0.33 | 0.32 | 0.30 | 0.30 | 0.31 | 0.31 |
| Tackiness | A | A | A | A | A | A | B | A |

Note: Not = Not present, Sli. = slightly present, Large = large amount of deposit was present part of poly(sodium styrenesulfonate) (weight average molecular weight: 10,000) was used instead of 0.2 part of poly(sodium styrenesulfonate) (weight average molecular weight: 7,000) as shown in Table 3 with all other conditions remaining the same. No precipitate was found in the polymer latex. No abnormal behavior was observed in the final step of the chloroprene rubber production.

Characteristics of the chloroprene rubber, its solution and adhesive were evaluated. The results are shown in Table 4. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 12

A chloroprene rubber adhesive was prepared by the same procedures as those described in Example 1 except that 0.5 part of poly(sodium styrenesulfonate) (weight average molecular weight: 50,000) was used instead of 0.2 part of poly(sodium styrenesulfonate) (weight average molecular weight: 7,000) as shown in Table 3 with all other conditions remaining the same. No precipitate was found in the polymer latex. Deposition of a slight amount of rubber was observed when the pH value was adjuted to 6 with dilute aqueous acetic acid in the final step of the chloroprene rubber production, but the intended chloroprene rubber could be satisfactorily obtained.

Characteristics of the chloroprene rubber, its solution and adhesive were evaluated. The results are shown in Table 4. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 13

A chloroprene rubber adhesive was prepared by the same procedures as those described in Example 1 except that 0.5 part of poly(sodium styrenesulfonate) (weight average molecular weight: 500,000) was used instead of 0.2 part of poly(sodium styrenesulfonate) (weight average molecular weight: 7,000) as shown in Table 3 with all other conditions remaining the same. No precipitate was found in the polymer latex. Deposition of a large amount of rubber was observed when the pH value was adjusted to 6 with dilute aqueous acetic acid in the final step of the chloroprene rubber production, but the intended chloroprene rubber could be obtained.

Characteristics of the chloroprene rubber, its solution and adhesive were evaluated. The results are shown in Table 4. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 14

A chloroprene rubber adhesive was prepared by the same procedures as those described in Example 1 except that 0.5 part of poly(sodium 2-acrylamide-2-methylpropanesulfonate) (weight average molecular weight: 10,000) was used instead of 0.2 part of poly(sodium styrenesulfonate) (weight average molecular weight: 7,000) as shown in Table 3 with all other conditions remaining the same. No precipitate was found in the polymer latex. Deposition of a slight amount of rubber was observed when the pH value was adjusted to 6 with dilute aqueous acetic acid in the final step of the chloroprene rubber production, but the intended chloreprene rubber could be satisfactorily obtained.

Characteristics of the chloroprene rubber, its solution and adhesive were evaluated. The results are shown in Table 4. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 15

A chloroprene rubber adhesive was prepared by the same procedures as those described in Example 1 except that 0.5 part of a polystyrenesulfonic acid type high-molecular-weight anionic surface active agent (trademark "Polity PS"-1900 supplied by Lion Corp.) was used instead of 0.2 part of poly(sodium styrenesulfonate) (weight average molecular weight: 7,000) as shown in Table 3 with all other conditions remaining the same. No precipitate was found in the polymer latex. No abnormal behavior was observed in the final step of the chloroprene rubber production.

Characteristics of the chloroprene rubber, its solution and adhesive were evaluated. The results are shown in Table 4. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 16

A chloroprene rubber adhesive was prepared by the same procedures as those described in Example 1 except that 0.1 part of poly(vinyl potassium sulfate) (supplied by Wako Pure Chem. Ind., Ltd) and 0.1 part of a condensate of naphthalenesulfonic acid with formaldehyde (tradename "Demol" supplied by Kao Corp.) were used instead of 0.2 part of poly(sodium styrenesulfonate) (weight average molecular weight: 7,000) as shown in Table 3 with all other conditions remaining the same. No precipitate was found in the polymer latex. Deposition of a slight amount of rubber was observed when the pH value was adjusted to 6 with dilute aqueous acetic acid in the final step of the chloroprene rubber production, but the intended chloroprene rubber could be satisfactorily obtained.

Characteristics of the chloroprene rubber, its solution and adhesive were evaluated. The results are shown in Table 4. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 17

A chloroprene rubber adhesive was prepared by the same procedures as those described in Example 1 except that 1.0 part of a sodium styrenesulfonate/methyl methacrylate copolymer (Nass/MMA=70/30 mol %, weight average molecular weight=6,000) was used instead of 0.2 part of poly(sodium styrenesulfonate) (weight average molecular weight: 7,000) as shown in Table 3 with all other conditions remaining the same. No precipitate was found in the polymer latex. No abnormal behavior was observed in the final step of the chloroprene rubber production.

Characteristics of the chloroprene rubber, its solution and adhesive were evaluated. The results are shown in Table 4. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 18

A chloroprene rubber adhesive was prepared by the same procedures as those described in Example 1 except that 0.3 part of a sodium styrenesulfonate/methacrylic acid copolymer (Nass/MAA=50/50 mol %, weight average molecular weight=3,000) was used instead of 0.2 part of poly(sodium styrenesulfonate) (weight average molecular weight: 7,000) as shown in Table 5 with all other conditions remaining the same. No precipitate was found in the polymer latex. No abnormal behavior was observed in the final step of the chloroprene rubber production.

Characteristics of the chloroprene rubber, its solution and adhesive were evaluated. The results are shown in Table 6. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 19

A chloroprene rubber adhesive was prepared by the same procedures as those described in Example 18 except that a sodium styrenesulfonate/methacrylic acid copolymer (Nass/MAA=50/50 mol %, weight average molecular weight=7,000) was used instead of a sodium styrenesulfonate/methacrylic acid copolymer (Nass/MAA=50/50 mol %, weight average molecular weight=3,000) as shown in table 5 with all other conditions remaining the same. No precipitate was found in the polymer latex. No abnormal behavior was observed in the final step of the chloroprene rubber production.

Characteristics of the chloroprene rubber, its solution and adhesive were evaluated. The results are shown in Table 6. As seen from these results, the shades of the chloroprene rubber, the chloreprene rubber solution and the chloroprene rubber adhesive were white only slightly tinged with pale yellow, shade change by heat-aging and ultraviolet rays was very small, and tackiness was good.

TABLE 5

(parts by weight)

| | Examples | | | | | | | | | | | Comp. Examples | | |
|---|---|---|---|---|---|---|---|---|---|---|---|---|---|---|
| | 18 | 19 | 20 | 21 | 22 | 23 | 24 | 25 | 26 | 27 | 28 | 1 | 2 | 3 |
| Chloroprene | 100 | 100 | 100 | 100 | 100 | 100 | 100 | 100 | 100 | 100 | 100 | 100 | 100 | 100 |
| n-Dodecyl mercaptan | 0.12 | 0.12 | 0.12 | 0.12 | 0.12 | 0.12 | 0.12 | 0.12 | 0.12 | 0.12 | 0.12 | 0.12 | 0.12 | 0.12 |
| Disproportioned K rosinate *1 | 4.0 | 4.0 | 4.0 | 4.0 | 4.0 | 4.0 | 4.0 | 4.0 | 4.0 | 2.0 | 6.0 | 4.0 | 4.0 | 4.0 |
| Nass/MAA 03-5 *2 | 0.3 | — | — | — | 0.2 | 0.7 | — | — | — | 0.3 | 0.3 | — | — | — |
| Nass/MAA 07-5 *3 | — | 0.3 | — | — | — | — | — | — | — | — | — | — | — | — |
| Nass/MAA 10-5 *4 | — | — | 0.3 | — | — | — | — | — | — | — | — | — | — | — |
| Nass/MAA 50-5 *5 | — | — | — | 0.3 | — | — | — | — | — | — | — | — | — | — |
| Nass/MAA 03-2 *6 | — | — | — | — | — | — | 0.3 | — | — | — | — | — | — | — |
| Nass/MAA 03-8 *7 | — | — | — | — | — | — | — | 0.3 | — | — | — | — | — | — |
| Nass/MAAM *8 | — | — | — | — | — | — | — | — | 0.3 | — | — | — | — | — |
| FNS *9 | — | — | — | — | — | — | — | — | — | — | — | 0.7 | — | — |
| DBS *10 | — | — | — | — | — | — | — | — | — | — | — | — | 0.5 | — |
| PMAANa *11 | — | — | — | — | — | — | — | — | — | — | — | — | — | 0.5 |
| Reducing agent *12 | 0.005 | 0.005 | 0.005 | 0.005 | 0.005 | 0.005 | 0.005 | 0.005 | 0.005 | 0.005 | 0.005 | 0.005 | 0.005 | 0.005 |
| Sodium hydroxide | 0.2 | 0.2 | 0.2 | 0.2 | 0.2 | 0.2 | 0.2 | 0.2 | 0.2 | 0.2 | 0.2 | 0.2 | 0.2 | 0.2 |
| Pure water | 100 | 100 | 100 | 100 | 100 | 100 | 100 | 100 | 100 | 100 | 100 | 100 | 100 | 100 |
| Short-stopper *13 | 0.05 | 0.05 | 0.05 | 0.05 | 0.05 | 0.05 | 0.05 | 0.05 | 0.05 | 0.05 | 0.05 | 0.05 | 0.05 | 0.05 |

Note:
*1 Disproportioned potassium rosinate (trademark "Rondis R" supplied by Arakawa Chem. Co.)
*2 Sodium styrenesulfonate/methacrylic acid copolymer (Nass/MAA = $5\%_0$ by mole, weight average molecular weight = 3,000)
*3 Sodium styrenesulfonate/methacrylic acid copolymer (Nass/MAA = $5\%_0$ by mole, weight average molecular weight = 7,000)
*4 Sodium styrenesulfonate/methacrylic acid copolymer (Nass/MAA = $5\%_0$ by mole, weight average molecular weight = 10,000)
*5 Sodium styrenesulfonate/methacrylic acid copolymer (Nass/MAA = $5\%_0$ by mole, weight average molecular weight = 50,000)
*6 Sodium styrenesulfonate/methacrylic acid copolymer (Nass/MAA = $2\%_0$ by mole, weight average molecular weight = 3,000)
*7 Sodium styrenesulfonate/methacrylic acid copolymer (Nass/MAA = $8\%_0$ by mole, weight average molecular weight = 3,000)
*8 Sodium styrenesulfonate/methacrylic amide copolymer (Nass/MAAM = $5\%_0$ by mole, weight average molecular weight = 3,000)
*9 Condensate of naphthalenesulfonic acid with formaldehyde (trademark "Demol N" supplied by Kao Corp.)
*10 Sodium dodecylbenzenesulfonate
*11 Poly(sodium methacrylate) (weight average molecular weight = 7,000)
*12 Sodium hydrosulfite
*13 2,6-Di-tert.-butyl-4-methylphenol

TABLE 6

|  | Examples |  |  |  |  |  |  |  |  |  |  | Comp. Examples |  |  |
|---|---|---|---|---|---|---|---|---|---|---|---|---|---|---|
|  | 18 | 19 | 20 | 21 | 22 | 23 | 24 | 25 | 26 | 27 | 28 | 1 | 2 | 3 |
| Presence of deposit upon polymerization | Not | Not | Not | Not | Not | Not | Not | Not | Not | Sli. | Not | Not | Not | Not |
| Presence of deposit *1 |  |  |  |  |  |  |  |  |  |  |  |  |  |  |
| upon neutralization | Not | Not | Sli. | Pre. | Sli. | Not | Pre. | Not | Sli. | Not | Not | Not | Not | Ent. |
| upon water-washing | Not | Not | Not | Not | Not | Not | Not | Not | Not | Not | Not | Not | Not | — |
| Shade of rubber (b value) | 7.2 | 7.5 | 7.5 | 6.0 | 6.8 | 8.0 | 7.3 | 7.0 | 7.5 | 7.0 | 8.8 | 12.7 | 6.5 | — |
| Shade of rubber solution (light absorbance) | 0.05 | 0.05 | 0.06 | 0.08 | 0.05 | 0.08 | 0.07 | 0.06 | 0.10 | 0.05 | 0.12 | 0.35 | 0.04 | — |
| Shade change by heat-aging |  |  |  |  |  |  |  |  |  |  |  |  |  |  |
| (b value) | 9.5 | 10.0 | 10.0 | 11.0 | 9.0 | 12.0 | 9.5 | 10.8 | 11.0 | 9.5 | 12.0 | 14.0 | 9.3 | — |
| (light absorbance) | 0.12 | 0.13 | 0.15 | 0.18 | 0.10 | 0.28 | 0.10 | 0.20 | 0.15 | 0.10 | 0.30 | 0.54 | 0.10 | — |
| Shade change by ultraviolet rays |  |  |  |  |  |  |  |  |  |  |  |  |  |  |
| (4 hours) | A | A | A | A | A | A | A | A | A | A | A | C | A | — |
| (10 hours) | B | B | B | B | B | B | B | B | B | B | B | C | B | — |
| Shade of adhesive (light absorbance) | 0.25 | 0.30 | 0.33 | 0.37 | 0.23 | 0.38 | 0.30 | 0.35 | 0.35 | 0.25 | 0.40 | 0.48 | 0.25 | — |
| Tackiness | A | A | A | A | A | A | A | A | A | A | A | A | C | — |

Note *1 Not = not present, Sli. = slightly present, Pre. = present, Ent. = the entire amount was deposited

EXAMPLE 20

A chloroprene rubber adhesive was prepared by the same procedures as those described in Example 18 except that a sodium styrenesulfonate/methacrylic acid copolymer (Nass/MAA=50/50 mol %, weight average molecular weight=10,000) was used instead of a sodium styrenesulfonate/methacrylic acid copolymer (Nass/Maa=50/50 mol %, weight average molecular weight=3,000) as shown in Table 5 with all other conditions remaining the same. No precipitate was found in the polymer latex. Deposition of a slight amount of rubber was observed when the pH value was adjusted to 6 with dilute aqueous acetic acid in the final step of the chloroprene rubber production, but the intended chloroprene rubber could be satisfactorily obtained.

Characteristics of the chloroprene rubber, its solution and adhesive were evaluated. The results are shown in Table 6. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 21

A chloroprene rubber adhesive was prepared by the same procedures as those described in Example 18 except that a sodium styrenesulfonate/methacrylic acid copolymer (Nass/MAA=50/50 mol %, weight average molecular weight=50,000) was used instead of a sodium styrenesulfonate/methacrylic acid copolymer (Nass/MMA=50/50 mol %, weight average molecular weight=3,000) as shown in Table 5 with all other conditions remaining the same. No precipitate was found in the polymer latex. Deposition of rubber was observed when the pH value was adjusted to 6 with dilute aqueous acetic acid in the final step of the chloroprene rubber production, but the intended chloroprene rubber could be obtained.

Characteristics of the chloroprene rubber, its solution and adhesive were evaluated. The results are shown in Table 6. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 22

A chloroprene rubber adhesive was prepared by the same procedures as those described in Example 18 except that the amount of the sodium styrenesulfonate/methacrylic acid copolymer was changed to 0.2 part as shown in Table 5 with all other conditions remaining the same. No precipitate was found in the polymer latex. Deposition of a slight amount of rubber was observed when the pH value was adjusted to 6 with dilute aqueous acetic acid in the final step of the chloroprene rubber production, but the intended chloroprene rubber could be satisfactorily obtained.

Characteristics of the chloroprene rubber, its solution and adhesive were evaluated. The results are shown in Table 6. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 23

A chloroprene rubber adhesive was prepared by the same procedures as those described in Example 18 except that the amount of the sodium styrenesulfonate/methacrylic acid copolymer was changed to 0.7 part as shown in Table 5 with all other conditions remaining the same. No precipitate was found in the polymer latex. No abnormal behavior was observed in the final step of the chloroprene rubber production.

Characteristics of the chloroprene rubber, its solution and adhesive were evaluated. The results are shown in Table 6. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 24

A chloroprene rubber adhesive was prepared by the same procedures as those described in Example 18 except that a sodium styrenesulfonate/methacrylic acid copolymer (Nass/MAA=20/80 mol %, weight average molecular weight=3,000) was used instead of a sodium styrenesulfonate/methacrylic acid copolymer (Nass/MAA=50/50 mol %, weight average molecular weight=3,000) as shown in Table 5 with all other conditions remaining the same. No precipitate was found in the polymer latex. Deposition of rubber was observed when the pH value was adjusted to 6 with dilute aqueous acetic acid in the final step of the chloroprene rubber production, but the intended chloroprene rubber could be obtained.

Characteristics of the chloroprene rubber, its solution and adhesive were evaluated. The results are shown in Table 6. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 25

A chloroprene rubber adhesive was prepared by the same procedures as those described in Example 18 except that a sodium styrenesulfonate/methacrylic acid copolymer (Nass/MAA=80/20 mol %, weight average molecular weight=3,000) was used instead of a sodium styrenesulfonate/methacrylic acid copolymer (Nass/MAA=50/50 mol %, weight average molecular weight=3,000) as shown in Table 5 with all other conditions remaining the same. No precipitate was found in the polymer latex. No abnormal behavior was observed in the final step of the chloroprene rubber production.

Characteristics of the chloroprene rubber, its solution and adhesive were evaluated. The results are shown in Table 6. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 26

A chloroprene rubber adhesive was prepared by the same procedures as those described in Example 18 except that a sodium styrenesulfonate/methacryl amide copolymer (Nass/MAAM=50/50 mol %, weight average molecular weight=5,000) was used instead of a sodium styrenesulfonate/methacrylic acid copolymer (Nass/MAA=50/50 mol %, weight average molecular weight=3,000) as shown in Table 5 with all other conditions remaining the same. No precipitate was found in the polymer latex. Deposition of a slight amount of rubber was observed when the pH value was adjusted to 6 with dilute aqueous acetic acid in the final step of the chloroprene rubber production, but the intended chloroprene rubber could be satisfactorily obtained.

Characteristics of the chloroprene rubber, its solution and adhesive were evaluated. The results are shown in Table 6. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 27

A chloroprene rubber adhesive was prepared by the same procedures as those described in Example 18 except that the amount of disproportioned potassium rosinate was changed to 2 parts as shown in Table 5 with all other conditions remaining the same. A slight precipitate was found on the stirrer in the polymer latex, but no abnormal behavior was observed in the final step of the chloroprene rubber production.

Characteristics of the chloroprene rubber, its solution and adhesive were evaluated. The results are shown in Table 6. As seen from these results, the shades of the chloroprene rubber, the chloroprene rubber solution and the chloroprene rubber adhesive were white only slightly tinged with pale yellow, shade change by heat-aging and ultraviolet rays was very small, and tackiness was good.

EXAMPLE 28

A chloroprene rubber adhesive was prepared by the same procedures as those described in Example 18 except that the amount of disproportioned potassium rosinate was changed to 6 parts as shown in Table 5 with all other conditions remaining the same. No precipitate was found in the polymer latex. No abnormal behavior was observed in the final step of the chloroprene rubber production.

Characteristics of the chloroprene rubber, its solution and adhesive were evaluated. The results are shown in Table 6. As seen from these results, the shades of the chloroprene rubber, the chloroprene rubber solution and the chloroprene rubber adhesive were white only slightly tinged with pale yellow, shade change by heat-aging and ultraviolet rays was somewhat large, and tackiness was good.

COMPARATIVE EXAMPLE 1

A chloroprene rubber adhesive was prepared by the same procedures as those described in Example 1 except that 0.7 part of a condensate of naphthalenesulfonic acid with formaldehyde (tradename "Demol N" supplied by Kao Corp.) was used instead of 0.2 part of poly(sodium styrenesulfonate) (weight average molecular weight=7,000) as shown in Table 5 with all other conditions remaining the same. No precipitate was found in the polymer latex. No abnormal behavior was observed in the final step of the chloroprene rubber production.

Characteristics of the chloroprene rubber, its solution and adhesive were evaluated. The results are shown in Table 6. As seen from these results, tackiness of the chloreprene rubber was good, but shades of the chloroprene rubber, the chloroprene rubber solution and the chloroprene rubber adhesive were yellow, and shade change by heat-aging and ultraviolet rays was large.

COMPARATIVE EXAMPLE 2

A chloroprene rubber adhesive was prepared by the same procedures as those described in Example 1 except that 0.5 part of sodium dodecylbenzenesulfonate was used instead of 0.2 part of poly(sodium styrenesulfonate) (weight average molecular weight=7,000) as shown in Table 5 with all other conditions remaining the same. No precipitate was found in the polymer latex. No abnormal behavior was observed in the final step of the chloroprene rubber production.

Characteristics of the chloroprene rubber, its solution and adhesive were evaluated. The results are shown in Table 6.

As seen from these results, the shades of the chloroprene rubber, the chloroprene rubber solution and the chloroprene rubber adhesive were white only slightly tinged with pale yellow, and shade change by heat-aging and ultraviolet rays was small, but tackiness of the chloroprene rubber was very bad.

COMPARATIVE EXAMPLE 3

A chloroprene rubber adhesive was prepared by the same procedures as those described in Example 1 except that 0.5 part of poly(sodium methacrylate) (weight average molecular weight=7,000) was used instead of 0.2 part of poly (sodium styrenesulfonate) (weight average molecular weight=7,000) as shown Table 5 with all other conditions remaining the same. No precipitate was found in the polymer latex. However, a salient amount of rubber was deposited when the pH value was adjusted to 6 with dilute aqueous acetic acid in the final step of the chloroprene rubber production, and thus, the intended chloroprene rubber could not be obtained.

The chloroprene rubber produced by the process of the present invention exhibits a light-colored shade and a reduced shade change by heat-aging and ultraviolet rays, and has a good tackiness such that, when it is used as an adhesive, an appropriate tackiness of the adhesive applied on an adherend is kept over a long period, as compared with the conventional chloroprene rubber. Therefore, the chloroprene rubber is used as adhesives for various materials including wood, leather, cloth, rubber, plastics and metal articles.

What is claimed is:

1. A process for producing a chloroprene rubber wherein chloroprene or a mixture comprised of chloroprene and a monomer copolymerizable therewith is subjected to an aqueous radical emulsion polymerization, characterized in that the polymerization is effected by using an alkali metal salt of a disproportioned rosin acid as an emulsifier, and a water-soluble polymeric substance as a dispersion stabilizer, said water-soluble polymeric substance having at least one kind of group selected from the group consisting of a sulfonic acid group and sulfate ester groups, which group has been introduced by at least one procedure selected from an addition polymerization procedure and a procedure of a polymeric reaction following an addition polymerization.

2. A process for producing a chloroprene rubber according to claim 1, wherein said water-soluble polymeric substance has a styrenesulfonic acid structure.

3. A process for producing a chloroprene rubber according to claim 1, wherein said water-soluble polymeric substance is a water-soluble salt of a copolymer of styrenesulfonic acid with at least one copolymerizable monomer selected from the group consisting of unsaturated carboxylic acids and unsaturated carboxylic acid amides.

4. A process for producing a chloroprene rubber according to claim 3, wherein said copolymer comprises 10 to 90% by mole of styrenesulfonic acid units based on the sum of the styrenesulfonic acid units and the unsaturated carboxylic acid units and/or the unsaturated carboxylic acid amide units.

5. A process for producing a chloroprene rubber according to claim 1, wherein the amount of at least one group selected from the group consisting of a sulfonic acid group and sulfate ester groups in the water-soluble polymeric substance is at least 10% by mole.

6. A process for producing a chloroprene rubber according to claim 1, wherein said water-soluble polymeric substance has a weight average molecular weight from $1\times10^3$ to $1\times10^5$.

7. A process for producing a chloroprene rubber according to claim 1, wherein said water-soluble polymeric substance is used in an amount of 0.1 to 2 parts by weight based on 100 parts by weight of the chloroprene or the chloroprene/copolymerizable monomer mixture.

8. A process for producing a chloroprene rubber according to claim 1, wherein said disproportioned rosin acid has an average molecular weight not higher than about 500.

9. A process for producing a chloroprene rubber according to claim 1, wherein said alkali metal salt of a disproportioned rosin acid is used in an amount of 2 to 6 parts by weight based on 100 parts by weight of the chloroprene or the chloroprene/copolymerizable monomer mixture.

10. A process for producing a chloroprene rubber according to claim 1, wherein said water-soluble polymeric substance is added together with the alkali metal salt of a disproportioned rosin acid in a monomer charge of the chloroprene or the chloroprene/copolymerizable monomer mixture, or is added in an as-obtained polymer latex after polymerization.

* * * * *